United States Patent
Szwaykowski

(10) Patent No.: US 10,641,599 B2
(45) Date of Patent: May 5, 2020

(54) EXTENDING THE RANGE OF SPECTRALLY CONTROLLED INTERFEROMETRY BY SUPERPOSITION OF MULTIPLE SPECTRAL MODULATIONS

(71) Applicant: APRE INSTRUMENTS, LLC, Tuson, AZ (US)

(72) Inventor: Piotr Szwaykowski, Tucson, AZ (US)

(73) Assignee: APRE INSTRUMENTS, LLC, Tucson, AZ (US)

(*) Notice: Subject to any disclaimer, the term of this patent is extended or adjusted under 35 U.S.C. 154(b) by 66 days.

(21) Appl. No.: 15/806,717

(22) Filed: Nov. 8, 2017

(65) Prior Publication Data
US 2018/0149463 A1 May 31, 2018

Related U.S. Application Data

(60) Provisional application No. 62/427,959, filed on Nov. 30, 2016.

(51) Int. Cl.
*G01B 9/02* (2006.01)

(52) U.S. Cl.
CPC ..... *G01B 9/02002* (2013.01); *G01B 9/02009* (2013.01); *G01B 9/0209* (2013.01); *G01B 9/02057* (2013.01)

(58) Field of Classification Search
CPC .............. G01B 9/02002; G01B 9/0209; G01B 9/02057; G01B 9/02009
See application file for complete search history.

(56) References Cited

U.S. PATENT DOCUMENTS

| | | | |
|---|---|---|---|
| 4,872,755 A * | 10/1989 | Kuchel | G01J 9/02 356/495 |
| 8,422,026 B2 | 4/2013 | Olszak | |
| 8,675,205 B2 | 3/2014 | Olszak | |
| 8,810,884 B1 | 8/2014 | Olszak | |
| 9,581,428 B2 | 2/2017 | Olszak | |
| 9,581,437 B2 | 2/2017 | Smythe et al. | |
| 9,618,320 B2 | 4/2017 | Olszak | |

* cited by examiner

*Primary Examiner* — Hwa Andrew Lee
(74) *Attorney, Agent, or Firm* — Antonio R. Durando

(57) ABSTRACT

The range of measurement in spectrally controlled interferometry (SCI) is extended by superimposing multiple modulations on the low-coherence light used for the measurement. Optimally, a spectrally controllable light source modulated sinusoidally with low spectral frequency is combined with a delay line, such as provided by a Michelson interferometer. The resulting light is injected into a Fizeau interferometer to generate localized fringes at a distance corresponding to the effect of the spectrally modulated source combined with the optical path difference produced by the delay line. The combination provides a convenient way to practice SCI with all its advantages and with a range that can be extended to the degree required for any practically foreseeable application.

17 Claims, 4 Drawing Sheets

EXTENDING THE RANGE OF SPECTRALLY CONTROLLED INTERFEROMETRY BY SUPERPOSITION OF MULTIPLE SPECTRAL MODULATIONS

RELATED APPLICATIONS

This application is based on and claims the priority of U.S. Provisional Application No. 62/427,959, filed on Nov. 30, 2016.

BACKGROUND OF THE INVENTION

Field of the Invention

This invention relates in general to the field of interferometry and, in particular, to a method and apparatus for extending the range of spectrally controlled interferometry.

Description of the Prior Art

Spectrally controlled interferometry (SCI) is an interferometric technique that allows implementation of white light interferometry (WLI) measurement schemes in common-path interferometers. WLI is characterized by the absence of coherent noise because of the light's short coherence length, typically on the order of a few micrometers. However, WLI requires careful balancing of the optical path difference (OPD) in the interferometer so interference can take place in the measurement space (localized interference). Such arrangements can be complex and preclude the use of common-path interferometers, therefore forfeiting the advantages of WLI.

Conventional laser interferometers have the problem that dust and other contamination, diffraction on rough surfaces, etc., cause reduced measurement accuracy. Nonetheless, laser interferometry is extremely popular because it allows the use of common-path interferometer designs—a particular class of devices in which most of the errors introduced by the optical system cancel out allowing the manufacture of less expensive and more accurate instruments. The most commonly used design is the Fizeau interferometer.

SCI was introduced to the art during the last decade (see U.S. Pat. No. 8,422,026) as a novel interferometric technique that successfully combines both approaches and provides the advantages of both common-path interferometry and WLI. It produces localized interference in an unbalanced OPD interferometer along with means to introduce the phase shift required to use modern fringe analysis methods. One of the major advantages of SCI is that existing instrumentation can be adapted to this modality by replacing only the laser light source with one capable of proper spectral modulation. It allows the use, for example, of a Fizeau interferometer in the WLI mode while eliminating the problem of coherent noise. A number of different interferometric techniques are possible by manipulating only the spectral properties of such light source, as disclosed in co-owned U.S. Pat. Nos. 8,675,205, 8,810,884, 9,581,428, 9,581,437, and 9,618,320. In many cases SCI can supplant conventional phase shifting interferometry (PSI) because of its ability to isolate measured surfaces, directly measure distance from the reference object, and enable the performance of PSI without the use of any mechanical scanning mechanism.

However, practical interferometry applications often require that fringes be formed at a large distance from the reference surface, sometimes as far as several meters, such as for measuring radius of curvature, astronomy mirrors, and large geometry systems. This is difficult to achieve by spectral modulation alone because it requires periods of spectral modulation of the source on the order of picometers and shorter, which are difficult to achieve. Equation 1 expresses distance L of fringe formation from the reference surface as a function of the period $\Delta\lambda$ of the spectral modulation for a source with mean wavelength $\lambda$:

$$\Delta\lambda = \frac{\lambda^2}{2L} \quad (1)$$

For example, to form fringes at a distance of 1 m from the reference mirror for a source operating at a mean wavelength of 500 nm, the period of modulation needs to be 0.125 pm. Such small modulation periods are difficult both to produce and adequately control. Therefore, it would be very desirable and advantageous to have a system that allows fringes to form at significant distances from the reference in common path interferometric configurations and that at the same time affords all the advantages of SCI. This invention combines a spectrally modulated source with an optical delay line to achieve this goal.

SUMMARY OF THE INVENTION

In a general sense, the invention lies in the recognition that, due to the spectral modulation necessarily associated with spectrally controlled interferometry, the range of measurement space of the interferometer can be extended by superimposing multiple modulations on the low-coherence light used for the measurement. Optimally, the interferometer is of common-path configuration and each modulation is sinusoidal.

Accordingly, the preferred embodiment of the invention is the combination of a spectrally controllable light source modulated with low spectral frequency with a delay line, such as provided by a Michelson interferometer. The resulting light is capable of generating localized fringes at a distance corresponding to the effect of the spectrally modulated source combined with the optical path difference produced by the delay line. Thus, the combination provides a convenient way to practice SCI with all its advantages and with a range that can be extended to the degree required for any practically foreseeable application.

Because the spectrally controllable source required for the broad range of applications afforded by SCI is capable of modulating frequency as well as phase and amplitude of the spectrum, the invention enables the practice of SCI for the same applications, without limitation, but with a range of measurement limited only by the geometry of the delay line of the second modulator. On the other hand, because the second modulator is required only to extend the range of measurement, which is defined by the adopted period of modulation, the second modulator only needs to be capable of spectral modulation with adequately high frequency but without the need for the capability of controlling the modulation phase.

Various other advantages will become clear from the description of the invention in the specification that follows and from the novel features particularly pointed out in the appended claims. Therefore, this invention includes the features hereinafter illustrated in the drawings, fully described in the detailed description of the preferred embodiments and particularly pointed out in the claims, but such drawings and description disclose only some of the various ways in which the invention may be practiced.

DETAILED DESCRIPTION OF THE INVENTION

Figure 1:
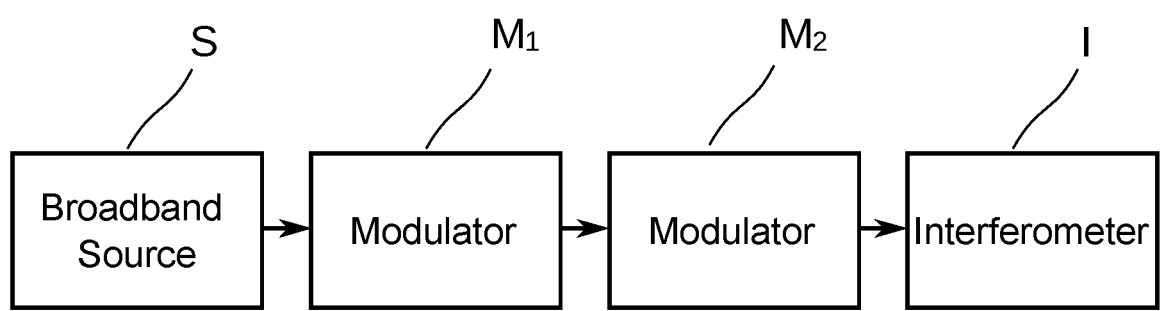
FIG. 1 is a schematic representation of the components required to practice SCI with an extended measurement range according to the invention.

As used herein, "localized fringes" is intended to mean, in the case of low-coherence light sources, interference fringes formed in a limited space around the location where the optical path difference (OPD) between the test and reference beams is close to zero; i.e., where the delay between the reference and test beams is very small. In the case of spectrally-controlled or multiple-wavelength sources, "localized fringes" is intended to mean unambiguously identifiable fringe patterns formed at predetermined distances from the reference surface. Throughout this disclosure, the word "localized" and related terms are used for convenience to describe the position of interferometric fringes in space in relation to the reference mirror of the interferometer, but it is understood that such fringes are only virtual fringes and that actual fringes are in fact formed on the instrument's detector only when the test surface is located at such "localized" positions in space.

Furthermore, as used in this disclosure, "white light" is intended to refer to any broadband light of the type used in the art of white-light interferometry, typically having a bandwidth on the order of many nanometers. Such bandwidth may be continuous or amount to a set of discrete wavelengths over the bandwidth. With reference to light, the terms "frequency" and "wavelength" may be used alternatively, as commonly done in the art, because of their well-known inverse relationship. "OPD" and "time delay" ($\tau$) are used alternatively because of their space/time relationship in interferometry. The terms "modulate" and "modulation" in connection with a light source are meant in the broadest sense as including any alteration of the frequency distribution, amplitude distribution or phase distribution of energy produced by the light source, and the synthesis of a light signal having a desired frequency, amplitude and phase distribution by any means. When used in connection with interference fringes, the term "modulation" refers to the fringe envelope. As specified above, localized fringes are described as positioned at the surfaces from which they are produced to illustrate how they relate to those surfaces and surface shapes that produce them; however, it is to be understood that physically the localized fringes actually exist in measurement space at the surface of a detector. Also, the phrase "producing localized fringes at a predetermined position in space" and related expressions are used for convenience, but it is understood that the precise intended meaning is "producing an interferometric environment whereby unambiguously identifiable fringe patterns are produced when a test surface is place at a predetermined position in space" relative to a reference surface. The terms "fringes" and "fringe patterns" are used interchangeably within the meaning normally accorded to them in the art. Finally, the generic term "interferometry" and related terms should be construed broadly as used in the art and not limited to shape measurements using an imaging interferometer. As such, interferometry is intended to include, without limitation, the measurement of changes in the position of an object, or of thickness of optical elements, using any known interferometric technique.

As mentioned, the present invention lies in the combination of a spectrally controllable light source, such as described in U.S. Pat. No. 8,810,884, with an additional spectrum modulator, such as a delay line, that introduces further frequency modulation in the light produced by the spectrally controllable source. The resulting beam is then injected into an interferometer, preferably a common-path interferometer, to practice SCI with a measurement range that can be extended simply by controlling the modulation produced by the delay line (for example). Referring to the drawings, FIG. 1 represents schematically an SCI system according to the invention. It includes a spectrally controllable source, which generally consists of a broadband light source S and a first spectrum modulator $M_1$ that applies a preferably sinusoidal modulation to the spectrum emitted by the source S; a second spectrum modulator $M_2$, and an interferometer I. The period of modulation $\Delta\lambda_1$ of the spectrally controllable source is preferably chosen such that interferometric fringes are formed at a short distance from the reference surface. This is because it is relatively easy in practice to implement low-frequency modulation and the result is stable and relatively free of noise. Next, the light so modulated is passed through the second modulator $M_2$, which adds additional, again preferably sinusoidal, modulation with a period $\Delta\lambda_2$ different from the period $\Delta\lambda_1$ of the first modulator. This modulation period is chosen such that the fringes are localized and rendered visible at a distance significantly larger than in the case produced by the first modulation. This twice modulated light is then injected into the common-path interferometer I and SCI is practiced in conventional manner as taught in the relevant patents referenced above.

Figure 2:
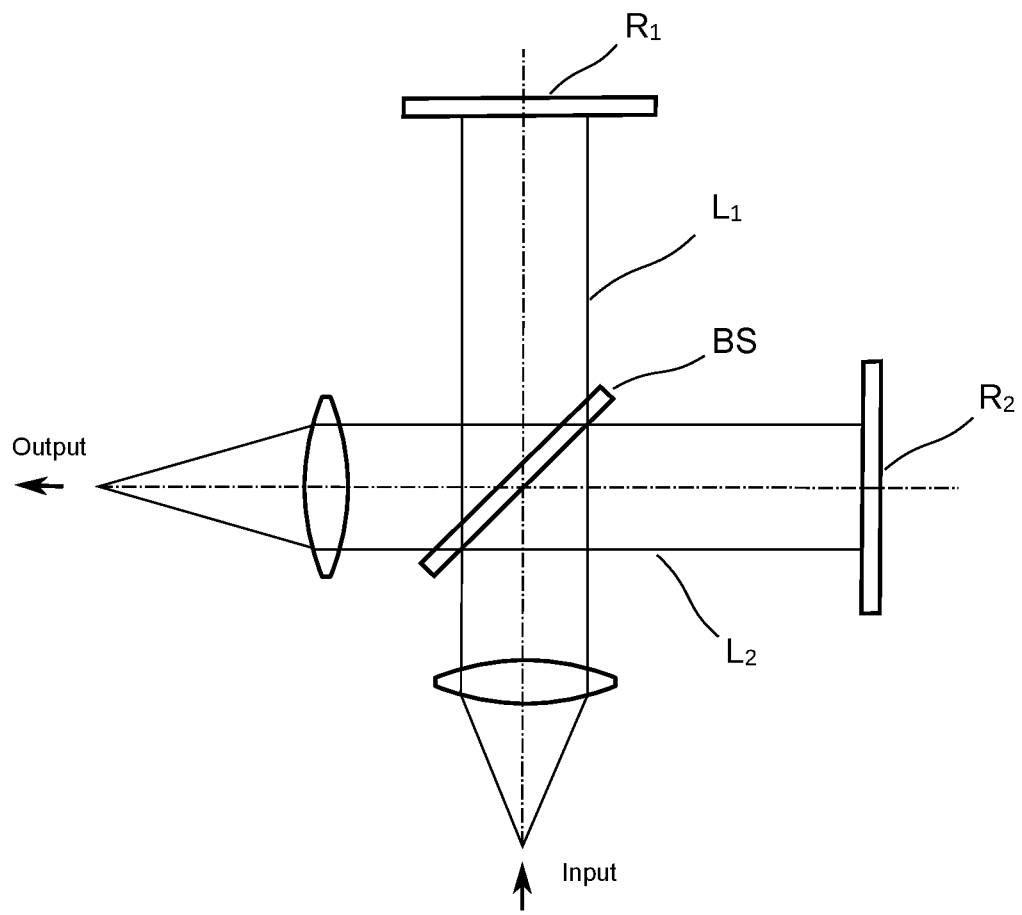
FIG. 2 is a schematic illustration of the delay line portion of a conventional Michelson interferometer.

The preferred modulation is sinusoidal because of its relative simplicity of implementation. Accordingly, the invention is described in terms of sinusoidal modulation; however, any modulation as a function of frequency that could be implemented to produce a desired fringe pattern would be acceptable to practice the invention. Similarly, the second modulator of the invention can be implemented conveniently with the delay line present in a conventional Michelson interferometer. Therefore, the invention is described in terms of such a delay line, but it should not be understood to be so limited. For convenience, a schematic representation of the Michelson configuration is shown in FIG. 2. The same can be said for the common-path configuration interferometer used to carry out SCI with an extended range according to the invention, which is described in terms of the preferred Fizeau configuration but could as well be implemented with other interferometers.

Referring to FIG. 2, the incoming Input light is divided by the beam splitter BS into separate beams that travel respective separate and different distances $L_1$ and $L_2$. After reflection from respective mirrors $R_1$ and $R_2$ along their separate paths, the beams are recombined at the beam splitter BS, and the spectrum of the resulting Output light is going to be modulated sinusoidally. As is well understood in the art, the period of modulation can be changed simply by adjusting the optical path difference $\Delta L=2(L_1-L_2)$, thereby providing an effective, easily implemented, and extremely convenient mechanism for changing the measurement range of the downstream interferometer for practicing SCI.

In general terms, the function of the modulator $M_1$ is to control the spectrum of the light emitted by the source S so as to produce fringes at a short distance from the reference surface. This can be achieved easily by using conventional spectrum filtering methods, such as a grating or any method described in the art. As described in U.S. Pat. No. 8,422,026, this modulator also needs to have the capability of changing the phase of the spectral modulation in order to allow the SCI implementation of any previously described fringe analysis methods, such as phase shifting and heterodyne detection (see U.S. Pat. No. 9,618,320). The function of the second modulator M2 is to apply the second sinusoidal spectral modulation to the interferometric beam such that fringes can be formed at significant and adjustable distances from the reference surface. As explained above, the use of the delay line of an unbalanced Michelson interferometer produces an Output light that is sinusoidally modulated. The period of modulation corresponds to the downstream location of formation of fringes at a distance from the reference mirror of the Fizeau interferometer I (FIG. 1) that is exactly equal to the difference in the optical paths of the arms of the Michelson delay line. This delay can be easily adjusted by changing the length of one of the arms and can reach measurement ranges in the order of several meters.

In summary, by using two modulators it is possible to produce a light beam with a spectrum reflecting the superposition of two sinusoidal modulations, one with a relatively coarse period $\Delta\lambda_1$, produced by a spectrally controllable light source, and the other with small period $\Delta\lambda_2$ produced by a delay line. As mentioned, the modulator $M_1$ also has the capability of manipulating the phase of the output signal. Accordingly, the combined spectral modulation of the beam received from the source S results in a multiplication of two sinusoidal modulations of the original spectrum, with an intensity distribution that can be calculated by the equation $$I(\lambda) = I_S(\lambda)\left(1 + A_1\sin\left(2\pi\frac{\lambda}{\Delta\lambda_1} + \varphi\right)\right)\left(1 + A_2\sin\left(2\pi\frac{\lambda}{\Delta\lambda_2}\right)\right), \quad (2)$$

where $I_S(\lambda)$ is the intensity of the source light, $\varphi$ is the phase shift of the spectral modulation controlled by the modulator $M_1$, and $A_1$ and $A_2$ are the contrasts of modulation produced by modulator $M_1$ and $M_2$, respectively.

Figure 3:
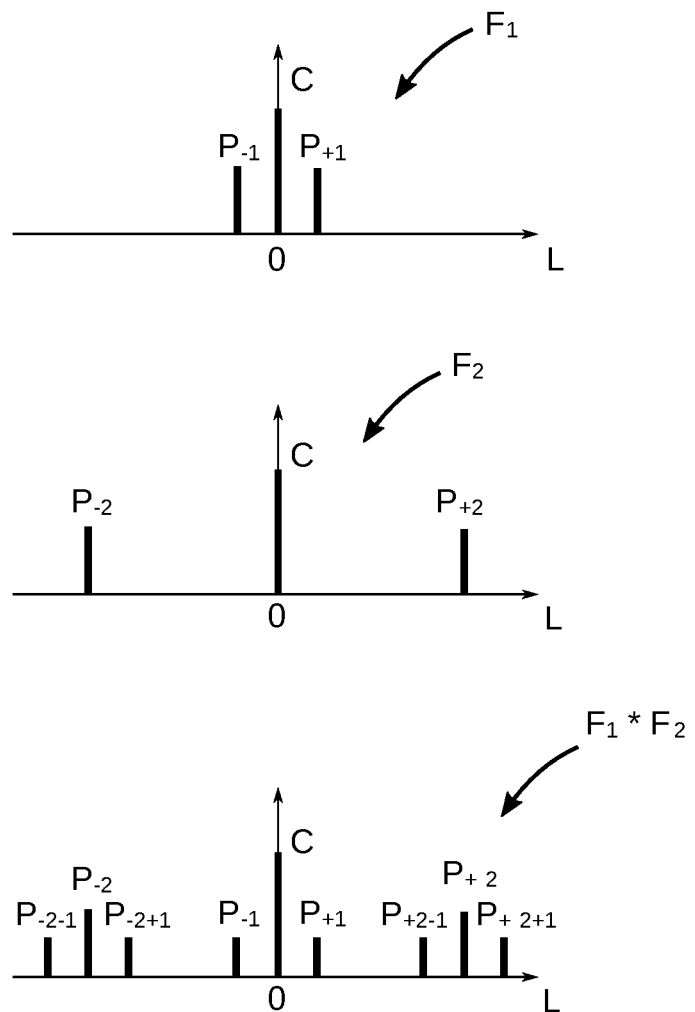
FIG. 3 presents three graphs illustrating the effect of superimposing two consecutive modulations on a source beam to produce fringe locations over an extended range of measurement using SCI techniques.

As disclosed and demonstrated in U.S. Pat. No. 8,422,026, Fourier analysis can be applied to predict where fringes are going to be visible in the measurement space of the interferometric system. Using the convolution theorem of Fourier analysis, the resulting function is a convolution of the functions describing the distribution of fringe contrast C for the individual modulations $M_1$ and $M_2$, denoted as $F_1$ and $F_2$; i.e., the resulting intensity distribution will be a convolution of the intensity distributions attributable to the original source when modulated separately by each sinusoidal signal. FIG. 3 illustrates such distributions of fringe contrast for a source modulated separately only by $M_1$, by $M_2$, and then by the combination of $M_1$ and $M_2$. The top graph shows the locations along the distance axis L of the fringe contrast visibility C for a spectral source with a single sinusoidal modulation with low-frequency period $\Delta\lambda_1$. The 0 distance indicates the location of the reference surface. As seen in the top graph, there are two locations, $P_{+1}$ and $P_{-1}$, where the fringes are going to be visible with peaks P. The peak with a positive index is located in front of the reference surface and the peak with a negative index is located behind the reference surface (corresponding to negative values of L). Similarly, the source modulated by $M_2$ alone (middle graph) produces peak locations $P_{+2}$ and $P_{-2}$ that are significantly further away from the reference surface because of the much smaller period of modulation $\Delta\lambda_2$ produced by the delay line. The fringe locations for the combined modulation $M_1*M_2$ of the source light are shown in the bottom graph of the figure and are the result of convolution of the intensity functions that produced the first and second graphs. In addition to the previously identified peaks, fringes are also visibly present at new locations offset from the original locations resulting from modulation $M_2$ (seen as peaks $P_{+2}$ and $P_{-2}$). These offsets correspond to the distance of fringe location produced by modulation $M_1$ on the source light in both positive and negative L directions. They are denoted as $P_{-2-1}$, $P_{-2+1}$ for negative values of L and $P_{+2-1}$, $P_{+2+1}$ for positive values of L. The first index indicates the location of the peak resulting from modulation $M_2$ and the second index shows the offset due to $M_1$. Inasmuch as the modulation $M_1$ produced by the first modulator has the capability of phase shifting, the fringes located at these new locations will have the same capability as well. Therefore, they can be used without mechanical shifting of the sample to analyze fringe patterns formed at these locations. It should be noted that the maximum contrast of fringes at all locations identified by two indices is reduced to 0.25, which is less than traditionally considered necessary for optimal fringe analysis. However, the recent availability of new, higher resolution cameras has rendered inconsequential this reduction in contrast.

It is also worth noting that the implementation of modulator $M_2$ can be achieved simply with a delay line such as that of a Michelson interferometer because $M_2$ does not require the ability to control the phase of the spectral modulation. The function of $M_2$ is only to introduce very short-period modulations into the spectrum. The function of fringe phase control can instead be allocated entirely to modulator $M_1$, which, contrary to $M_2$, needs to support only modest period spectrum modulations. Thus, in practice, it is possible to perform course adjustment of the fringe location using the modulator $M_2$ and fine tune the contrast of the fringes by adjusting the period of $M_1$. That is, the location of fringes is easily obtained by changing the $\Delta L$ in the delay line; once the fringes are identified, their precise location can be fine-tuned with $M_1$.

Figure 4:
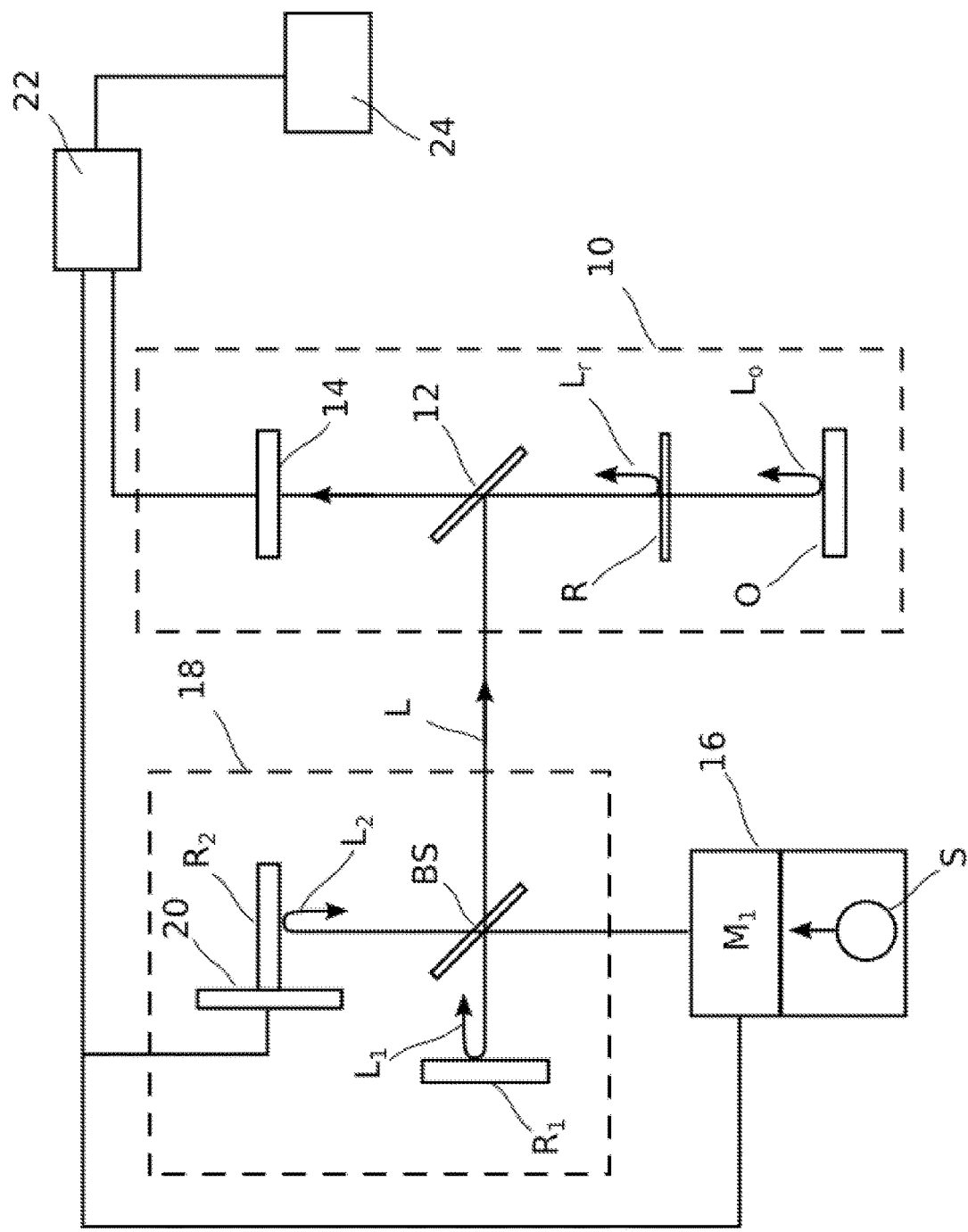
FIG. 4 illustrates an SCI system configured to practice the invention.

FIG. 4 illustrates the preferred combination of components of an interferometric system configured to practice SCI with an extended range according to the invention. A Fizeau interferometer 10 is used because of its common-path reference and object arms and the related advantages. The input beam L to the interferometer is reflected by a beam splitter 12 toward a reference surface R and an object surface O, from where respective reflected beams Lr and Lo travel in common path through the splitter 12, interfere, and are detected by a detector 14. As illustrated schematically in the figure, a spectrally controllable light source 16 (which in now conventional SCI practice can be implemented by the combination of a broadband source S with a first spectral modulator $M_1$—see FIG. 1—as taught in U.S. Pat. No. 8,810,884) is coupled to a Michelson interferometric delay line 18 (corresponding to the second modulator $M_2$ of FIG. 1) to produce a twice modulated beam that is injected into the Fizeau interferometer. The delay between the beams $L_1$ and $L_2$ reflected by the two mirrors $R_1$ and $R_2$, respectively, introduces the additional sinusoidal modulation required to extend the range of measurement of the Fizeau interferometer. A translating mechanism 20 is used to change the OPD between beams $L_1$ and $L_2$, in so doing providing a control over the fringe location in the measurement space of the interferometer. A computer 22 is used in conventional manner to produce the desired modulations in the light emitted by the source 12 and in the delay line 14 by controlling the translating mechanism 20. The computer 16 is also programmed to perform fringe analysis of the localized fringes produced in the measurement space of the interferometer. A monitor 24 is normally also provided for operator functionality.

While the invention has been shown and described herein in what is believed to be the most practical and preferred embodiments, it is recognized that departures can be made therefrom within the scope of the invention. For example, the invention has been illustrated with reference to Fizeau and Michelson interferometers, but the principles of this disclosure are equally applicable to any other type of laser interferometer where white-light scanning could provide advantages. Similarly, the invention has been described in terms of a spectrally controllable light source that includes a broadband source and a modulator as separate components because that is the way the invention has been implemented to date (on account of the development of the sources described in U.S. Pat. No 8,810,884); however, it is important to make clear that any single-component spectrally controllable source, such as currently available lasers capable of spectral modulation, would be suitable to practice the invention. Therefore, the term "spectrally controllable light source" is intended to mean any light source capable of spectral modulation. Furthermore, the modulation provided by the second modulator described above could also result from additional modulation provided by the same spectrally controllable source. Inasmuch as the heart of the invention is the recognition that the range of SCI can be extended by the application of multiple modulations to the light injected into the interferometer, those skilled in the art will readily understand that the result of the superposition of multiple modulations will be the same whether they occur sequentially or contemporaneously (as also indicated by the underlying mathematics). No single spectrally controllable source capable of such multiple modulations is known at the present time. However, it is likely that such light sources will be available in the future because of the demand driven by SCI and the fact that the physical requirements for their implementation are well understood. Therefore, for the purposes of the claims that follow, "spectrally controllable light source" is defined to include any light source capable of emitting spectrally modulated light, whether through single or multiple modulation, and whether through sequential or contemporaneous modulation. Thus, elements S, $M_1$ and $M_2$, shown as separate components in FIG. 1 for clarity of description, for the purposes of defining the scope of the invention should be considered to be a spectrally controllable light source, as claimed.

Furthermore, it is also important to underscore the fact that sinusoidal modulation is much preferred at this time for the reasons given above, but it is not essential to the invention. For example, spectral modulation could be obtained with an etalon, which would produce multiple visible fringes at each peak defined by the etalon's free spectral range. It is not envisioned that this type of modulation would be useful in the long-period modulation produced by the spectrally controllable source, but it could be in the implementation of the short-period modulation. As such, the measurement range of the interferometer could be extended to the limit allowed by the etalon's finesse and the corresponding loss of contrast. While such exemplary implementation is considered impractical at present, it could become important as the art of SCI continues to be developed. In view of the foregoing, the invention is not to be limited to the disclosed details but is to be accorded the full scope of the claims, including any and all equivalents thereof.

The invention claimed is:

1. An interferometric system for spectrally controlled interferometric measurements, comprising:
    an interferometer with a reference arm, an object arm, and means for combining reference and object beams to produce a combined interference beam;
    a spectrally controllable light source configured to produce a spectral modulation of a light beam to generate localized interference fringes with a modulation peak at a selected location along an optical path of the combined interference beam;
    a spectrum modulator configured to produce further spectral modulation of the light beam prior to injection into said interferometer, said further spectral modulation being superimposed on said spectral modulation produced by the spectrally controllable light source so as to extend a range for said selected location; and
    a computer programmed to produce said spectral modulation and said further spectral modulation of the light beam and to perform fringe analysis of the localized interference fringes;
    said selected location being controllable as a function of a modulation period applied to said spectrum modulator.

2. The interferometric system of claim 1, wherein said interferometer is a common-path interferometer.

3. The interferometric system of claim 2, wherein said common-path interferometer is a Fizeau interferometer.

4. The interferometric system of claim 1, wherein said spectrally controllable light source is configured to produce a sinusoidal spectral modulation.

5. The interferometric system of claim 1, wherein said spectrum modulator is configured to produce a sinusoidal further spectral modulation.

6. The interferometric system of claim 5, wherein said spectrum modulator comprises an interferometric delay line.

7. The interferometric system of claim 6, wherein said interferometric delay line is in Michelson configuration.

8. An interferometric system for spectrally controlled interferometric measurements, comprising:
    a Fizeau interferometer;
    a spectrally controllable light source configured to produce a sinusoidal spectral modulation to generate localized interference fringes with a modulation peak at a selected location along an optical path of an interference beam produced by said Fizeau interferometer;
    an interferometric delay line in Michelson configuration structured to further modulate light emitted by said spectrally controllable light source prior to injection into said Fizeau interferometer so as to superimpose a further spectral modulation on said sinusoidal spectral modulation produced by the spectrally controllable light source, a range of said selected location being thereby extended and controllable as a function of a sinusoidal modulation period applied through said delay line; and a computer programmed to operate said spectrally controllable light source and said interferometric delay line and to perform fringe analysis of said localized interference fringes.

9. A method for increasing the measurement range of a spectrally controlled interferometric system, comprising the following steps:
providing an interferometer with a reference arm, an object arm, and means for combining reference and object beams to produce a combined interference beam;
providing a spectrally controllable light source;
providing a spectrum modulator optically coupled to said interferometer;
operating said spectrally controllable light source so as to generate a spectrally modulated beam that produces localized interference fringes with a modulation peak at a selected location along an optical path of the combined interference beam; and
operating said spectrum modulator so as to further spectrally modulate said spectrally modulated beam prior to injection into said interferometer so as to superimpose a further spectral modulation on said spectrally modulated beam generated by the spectrally controllable light source, thereby extending a range of said selected location along said optical path of the combined interference beam.

10. The method of claim 9, wherein said steps of operating the spectrally controllable light source and of operating the spectrum modulator are carried out by applying, respectively, long and short periods of spectral modulation relative to each other.

11. The method of claim 10, wherein said interferometer is a common-path interferometer.

12. The method of claim 11, wherein said common-path interferometer is a Fizeau interferometer.

13. The method of claim 9, wherein said step of operating the spectrally controllable light source so as to generate a spectrally modulated beam is carried out with sinusoidal modulation.

14. The method of claim 9, wherein said step of operating the spectrum modulator so as to further spectrally modulate said spectrally modulated beam is carried out with sinusoidal modulation.

15. The method of claim 14, wherein said sinusoidal modulation is produced with an interferometric delay line.

16. The method of claim 15, wherein said interferometric delay line is in Michelson configuration.

17. The method of claim 9, wherein said interferometer is a Fizeau interferometer, said step of operating the spectrally controllable light source so as to generate a spectrally modulated beam is carried out with sinusoidal modulation, said step of operating the spectrum modulator so as to further spectrally modulate said spectrally modulated beam is carried out with sinusoidal modulation by an interferometric delay line in Michelson configuration; and said steps of operating the spectrally controllable light source and operating the spectrum modulator are carried out by applying, respectively, long and short periods of spectral modulation relative to each other.

* * * * *